United States Patent
Cowles et al.

(10) Patent No.: US 6,607,583 B2
(45) Date of Patent: Aug. 19, 2003

(54) METHOD AND APPARATUS FOR CONTROLLED HEATING OF ADSORBENT MATERIALS

(75) Inventors: Harold R. Cowles, 16 Mountain Wood Dr., Scotia, NY (US) 12302; William J. Stanley, Schagticoke, NY (US); Christopher M. Cueman, Saratoga Springs, NY (US)

(73) Assignee: Harold R. Cowles, Scotia, NY (US)

( * ) Notice: Subject to any disclaimer, the term of this patent is extended or adjusted under 35 U.S.C. 154(b) by 0 days.

(21) Appl. No.: 10/040,162

(22) Filed: Oct. 22, 2001

(65) Prior Publication Data

US 2003/0075045 A1 Apr. 24, 2003

(51) Int. Cl.⁷ .............................................. B01D 53/12
(52) U.S. Cl. ............................... 95/107; 95/148; 95/14; 219/780
(58) Field of Search .......................... 95/107–111, 114, 95/115, 143, 148, 14; 96/108, 112, 122, 123, 126, 130, 143, 146, 150; 219/772, 780, 201, 385

(56) References Cited

U.S. PATENT DOCUMENTS

| | | | |
|---|---|---|---|
| 3,608,273 A | * 9/1971 | Fabuss et al. | 95/148 |
| 4,149,023 A | * 4/1979 | Mizuno et al. | 159/DIG. 1 |
| 5,089,457 A | 2/1992 | Gaylard et al. | 502/5 |
| 5,496,395 A | * 3/1996 | Yamazaki | 55/356 |
| 5,505,825 A | * 4/1996 | Gold et al. | 95/126 |
| 5,676,738 A | 10/1997 | Cioffi et al. | 95/109 |
| 5,904,750 A | 5/1999 | Cowles | 95/109 |
| 5,912,423 A | * 6/1999 | Doughty et al. | 55/290 |
| 6,372,018 B1 | * 4/2002 | Cowles | 95/106 |

FOREIGN PATENT DOCUMENTS

| | | | |
|---|---|---|---|
| EP | 0905368 A2 | * | 3/1999 |
| JP | 11-114351 A | * | 4/1999 |
| SU | 1491563 A | * | 7/1989 |

* cited by examiner

Primary Examiner—Duane Smith
Assistant Examiner—Frank M. Lawrence
(74) Attorney, Agent, or Firm—Cahill, Sutton & Thomas P.L.C.

(57) ABSTRACT

A method and apparatus for controlling the heating of adsorbent materials in a vessel including the utilization of electrodes in direct contact with the adsorbent material to induce a current in the material. The electrical contacts are spaced apart and receive a potential for inducing the electrical current; one of the electrodes is a different size to thereby induce a radial component in the electrical current to thus modify the current density flowing through the adsorbent material as the current traverses the distance between the electrodes. The resulting modified current density causes the temperature gradient across the transverse section of the vessel to decrease, thus rendering the temperature more uniform across the vessel.

4 Claims, 4 Drawing Sheets

METHOD AND APPARATUS FOR CONTROLLED HEATING OF ADSORBENT MATERIALS

FIELD OF THE INVENTION

The present invention relates to means for effectively removing Volatile Organic Compounds (VOC's) from various industrial gases, and more particularly to a method and apparatus to facilitate the removal of such compounds trapped on or in adsorbent materials that have previously been utilized for the removal of such VOC's from a contaminated air stream. More specifically, the present invention relates to a novel method and apparatus for heating such adsorbent materials to effect the removal of adsorbed VOC's to permit the reuse of such adsorbent material; further, the invention is directed to a method and apparatus that may be utilized to reactivate adsorbent material when such material is an activated carbonaceous material.

BACKGROUND

Many industrial processes give rise to exhaust gases which contain volatile organic compounds (VOC's). VOC's are of concern, due not only to their direct toxicity in the vapor phase, but also because they can be photochemically reactive and lead to ground level ozone increases and increases in other gas phase irritants.

Reducing VOC's at the source is sometimes an option, but there are many processes for which this approach is not practical. As a result, there have been a number of "end of pipe" treatment technologies developed to collect or destroy the VOC's from process exhausts. Early technologies were widely based on thermal oxidation (incineration). So called "oxidation" equipment is effective at destruction of VOC's, but has several inherent drawbacks. These include high operating costs, high fuel consumption, and high levels of secondary pollutant generation. Improvement came in the form of rotor concentrator systems. These units can reduce the final treatment volume to a range of 10% to 20% of the original process effluent volume. This is an advantage relative to direct oxidation, but still requires the use of oxidation as final treatment. Therefore, some of the same issues still apply.

More recently, fluidized bed collection systems have shown promise as an improvement over both direct oxidation and rotor systems. The fluid bed is capable of very high percent reductions in process effluent volume to be treated, with a correspondingly high increase in concentration of the VOC's. In essence, the adsorbent used in the fluid bed system captures the VOC's in an adsorption section, and releases them at a much higher concentration in a regeneration or desorption section. In this way, the volume of material for final treatment can be reduced by factors of several thousand. This allows for economic destruction of the VOC's, or recovery of VOC's in original liquid form for reuse, where practical. Descriptions of fluidized bed systems can be found in the prior art. U.S. Pat. No. 5,904,750 is an example of this type of system for VOC control.

There are also descriptions in prior art of techniques for heating the adsorbents for drying and reactivation in a stand alone device (see for example U.S. Pat. No. 5,089,457). The use of electricity, directly applied to a column of activated carbon, for the purpose of heating is described. The system described in the U.S. Pat. No. 5,089,457 patent comprises a single columnar device, operated in a batch mode, or pulse mode. The purpose is singular, in that the device is used to reactivate spent carbon from a variety of remote industrial sources. It is not described as part of an integrated VOC control system.

A limitation of the device described in U.S. Pat. No. 5,089,457, and others of its kind, is that it does not solve the intrinsic problems associated with the heating of carbon in a columnar configuration, using electricity applied to the carbon itself. Those skilled in the art are aware that the application of electricity to activated carbon, and the heating which results, renders the method prone to the formation of localized hot spots. When contained in a column, activated carbon will display local variations in packing density, and particle-to-particle contact area. When electricity is applied, uneven heating occurs, due to the unpredictable and variable nature of the aforementioned items. As pointed out in the '457 patent, the radius of the columnar vessel must be limited to seventy-five particle diameters or less; otherwise, the system cannot maintain temperature control, and the intended function of the entire device is lost. This problem makes scale up to more practically sized systems impossible. In practice, even a columnar device with the seventy-five particle diameter limit of the radius suffers from localized heating problems. The most notable aspect of the problem is the large temperature differential which exists from the center for the column of adsorbent to the side. The difference becomes more severe as the diameter of the heating device increases, and as the temperature becomes higher.

OBJECTS OF THE INVENTION

It is therefore an object of the present invention to provide a method and apparatus for minimizing the temperature control problems associated with direct electric heating of activated carbon, and other conductive materials, in a columnar device—regardless of diameter.

It is a further object of the present invention to provide a continuously operating columnar device which utilizes electric current flowing through an adsorbent to achieve both regeneration and reactivation in the same vessel, using either steam or inert gas as appropriate.

It is yet another object of the present invention to provide an integrated VOC control method and apparatus which incorporates regeneration and reactivation techniques into a fully integrated VOC control system.

Another object of the present invention is to provide a method and apparatus for controlling the temperature of an adsorbent mass in a vessel by passive conductive elements strategically placed in a columnar heating section which redistribute current at selected locations to assure even heating of the adsorbent.

SUMMARY OF THE INVENTION

The present invention incorporates a method and apparatus for heating adsorbent materials through the conduction of electrical current therethrough by using spaced electrodes positioned within a column of the adsorbent material within a vessel. In one embodiment, the size of the electrodes is varied such that the second electrode incorporates a cross-sectional area of about 50% of the cross-sectional area of the first electrode; as a result of the size differential, the current flowing through the adsorbent material column incorporates a substantial radial component that effectively establishes a relative uniformity of the current density through the column and thus establishes uniformity of the temperature resulting from the heating of the material by the current flow. In an alternative embodiment, the electrodes remain the same size, but a passive conductive element, or a "dummy electrode" is positioned between the active electrodes such that the electrical current carrying capacity of this passive electrode alters the current density along the cross-section of the material column. As a result, the current density is rendered more uniform and the temperature of the material across a transverse section of the column is rendered more uniform. The present invention eliminates the radial temperature variations resulting from current heating of the adsorbent material in a vessel that, as described above, is present in prior art systems attempting to heat the adsorbent material by the application of a potential across a column of the material to induce an electrical current therethrough and thus heat the material.

BRIEF DESCRIPTION OF THE DRAWINGS

The present invention may more readily be described by reference to the accompanying drawings in which.

DETAILED DESCRIPTION OF THE PRESENT INVENTION

Figure 1:
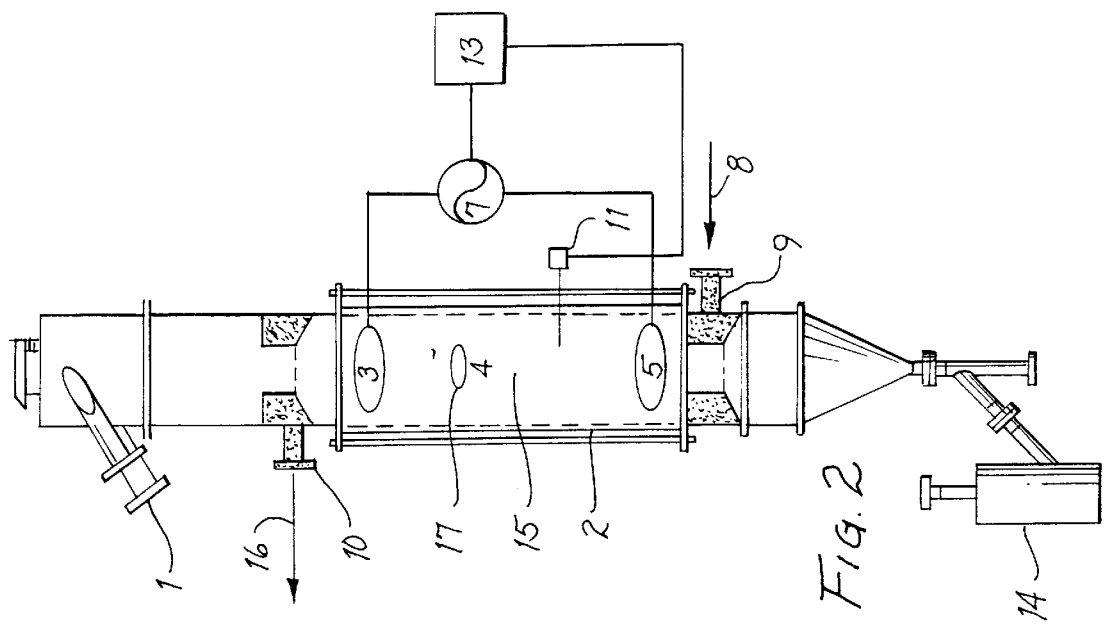
FIG. 1 is a schematic illustration of apparatus constructed in accordance with the teachings of the present invention and useful for describing the method of the present invention.

Referring to FIG. 1, adsorbent material enters a regeneration/reactivation vessel at the inlet 1 thereof. The regeneration vessel may be a cylindrical vessel constructed of non-electrical conducting material such as a ceramic, or may be formed of any material having an electrical insulating lining. Sufficient adsorbent material is provided such that the column of material in the vessel is always full. The carbonaceous adsorbent is caused to flow downward through the column at a controlled rate, as dictated by the operation and settings of adsorbent removal device 14. While the present invention is described in terms of carbonaceous adsorbent, and while such adsorbent is the most common used for the removal of VOC's in gas streams, other adsorbent materials are appropriate provided they are capable of being heated by electrical current passing therethrough. The electrical current may be an AC or DC current. In due course, the adsorbent flows through electrically non-conductive column section 2. The adsorbent flows over and around electrical elements 3, 4 and 5 contained in column section 2. A voltage is applied via power devices 6 and 7. As voltage is applied, current flows through the adsorbent column and heating of the adsorbent takes place. The VOC material collected on the adsorbent is released. A sweep gas, or carrier gas, 8 is directed into the adsorbent mass through inlet pipe 9 at the column lower section. The sweep gas flows upward through the heated mass of adsorbent 15, collecting the desorbed VOC vapor, and conveying it out of the column through outlet pipe 10. This desorbate stream 16 is directed to a final treatment device. Temperature in the bed is monitored using thermocouples 11 and 12. The signals from these thermocouples are fed to a programmable logic controller 13. Programmable logic controller 13 is programmed to provide a signal to power sources 6 and 7, such that the power sources provide the proper voltage required to maintain the preset desired temperature value. The preset temperature value or set point will depend on the boiling points of the VOC's in the case of regeneration, or it can be fixed at about the 1400° F. range for reactivation of the adsorbent material.

The carrier gas 8 may be air (if the VOC's do not pose a flammability problem), nitrogen or other inert gas, flue gas, or water vapor (steam), depending on available utilities. In the case of reactivation, steam is required in whole or in part, for the water-gas shift reaction to take place.

The system can be operated with one heated zone, in which case only two of the three electrical elements or electrodes are needed. It has been found that whether a single zone or multiple zones are used, the elements should be of varied sizes or diameters. One electrode or element should be larger, ideally extending over substantially the entire cross-sectional area of the desorber column, while the other should be smaller, covering an area of less than 60% and preferably an area of about 50% or less of the cross-sectional area of the desorber column. The varying sizes or diameters of the electrical elements forces current to flow both longitudinally and radially through the adsorbent mass column and eliminates the channeling of power in the central area of the heated zone or zones, and eliminates the uneven temperature profile arising from longitudinal current flow only. In the case of two zones, the top and bottom electrodes 3 and 5 can be the same size, while the middle electrode 4 can be larger or smaller. The upper or lower of a pair of electrodes can be smaller or larger diameter, depending on the temperature range and process conditions. The large/small orientation can effect the temperature profile differently at different operating temperatures.

Figure 2:
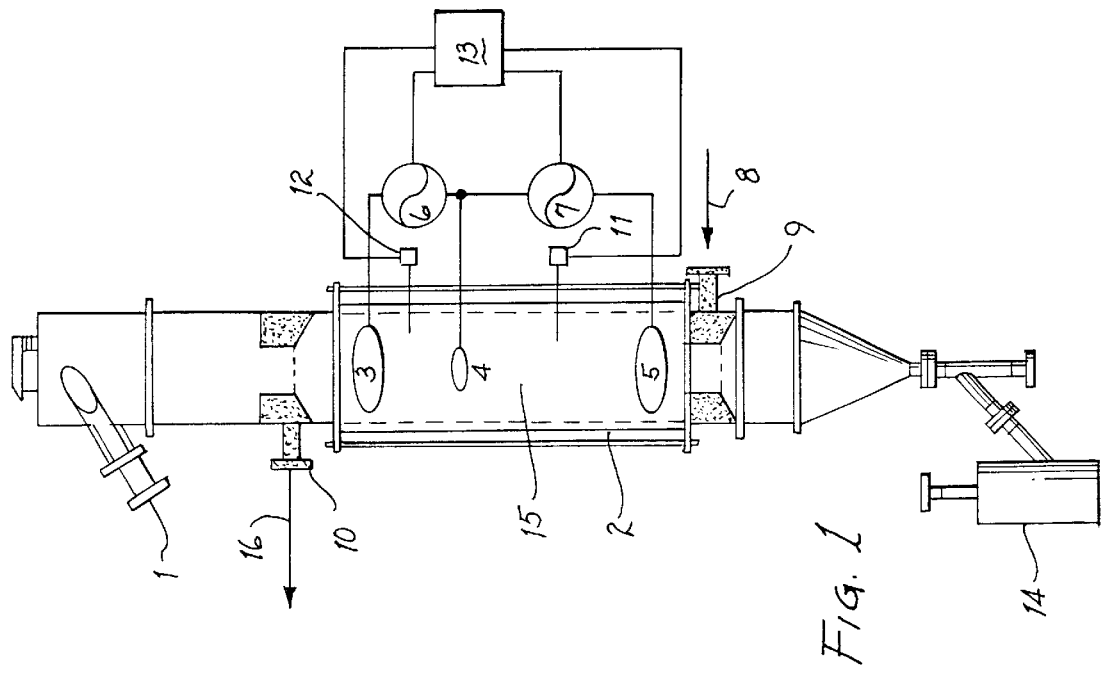
FIG. 2 is another embodiment of the apparatus of FIG. 1.

Referring now to FIG. 2, elements that correspond to similar elements in FIG. 1 have like reference numerals. The embodiment shown in FIG. 2 utilizes a passive conductive element 17 to redirect current flow in a specific location. Note that the element 17 is not connected to any voltage or power source. Electrodes 3 and 5 are energized, providing a current for directly heating the adsorbent. Only a single power supply 7 is needed, thus simplifying the system and reducing cost. Passive element 17, having a diameter which varies from electrodes 3 and 5, is placed between the electrodes to redirect the otherwise essentially axial flow of current and induce an axial component to the current, thus forcing even heating from top to bottom. All temperature control aspects of the embodiment of FIG. 2 are similar to FIG. 1. The placement of passive conductive elements is variable, as the process conditions dictate. Multiple passive conductive elements, of varied size and shape, may be used.

Figure 3:
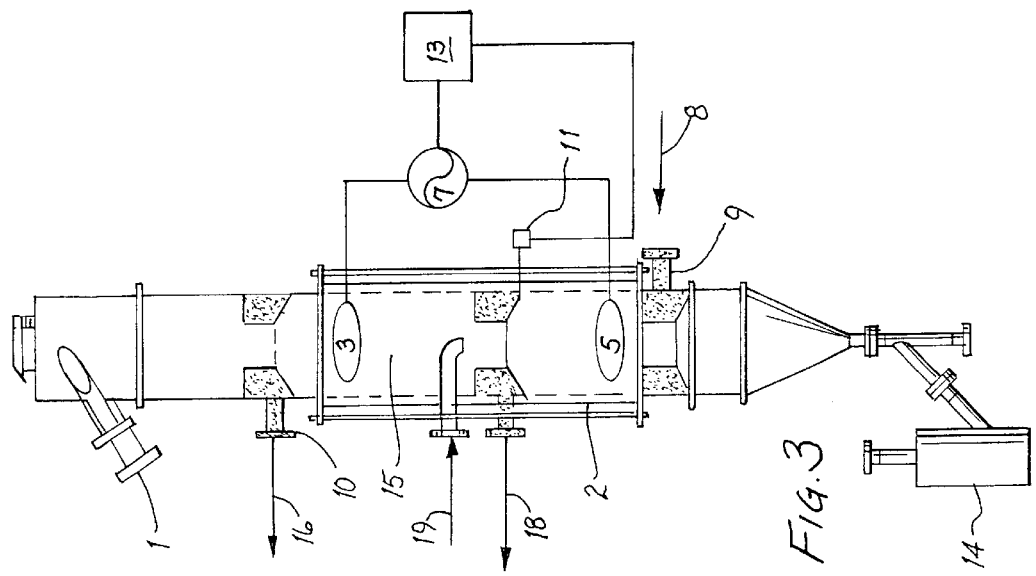
FIG. 3 is still another embodiment of apparatus constructed in accordance with the teaching of the present invention utilizing a single heated zone but providing dual desorbate take-offs.

Referring to FIG. 3, regeneration/reactivation apparatus is shown having one overall heated zone; however, in this particular embodiment, the desorbate stream is removed from the center of the heated zone via take-off pipe 18. Further, the desorbate can also be taken from the top section, at take-off pipe 10. Another option is to have two separate sweep gas inlets and take-off points with the second source of sweep gas entering at inlet 19, and exiting at outlet pipe 10. This configuration provides a preheating mechanism to minimize the opportunity for VOC re-adsorption on the carbon adsorbent in the cooler upper areas. Again, the size of the electrodes 3 and 5 differ to induce a radial component in the current flowing through the adsorbent materials and thus create a more uniform temperature profile.

Figure 4:
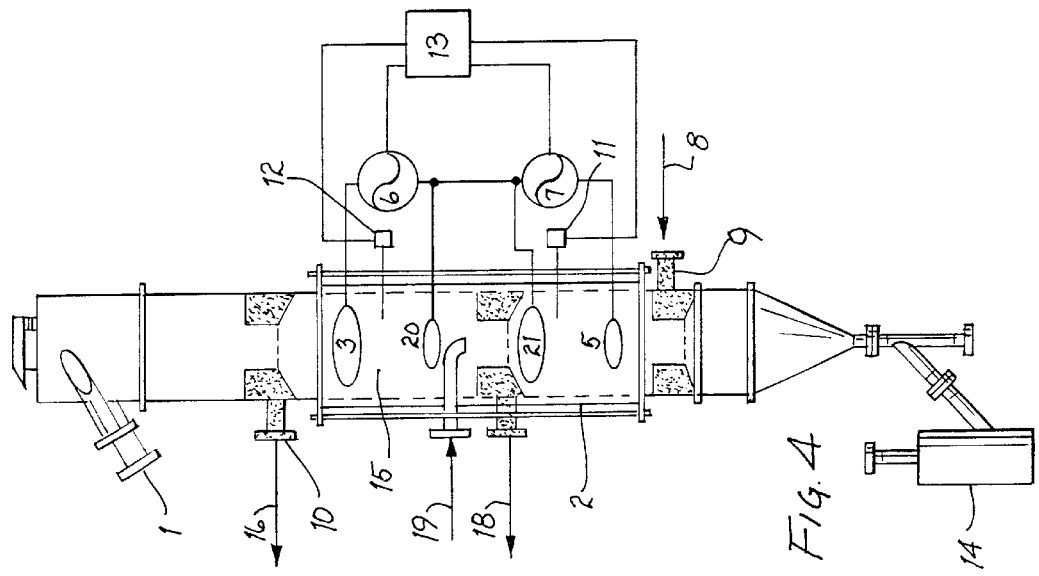
FIG. 4 is an embodiment of the present invention incorporating dual heated zones combined with dual desorbate take-off pipes.

The embodiment of FIG. 4 is similar to that shown in FIG. 3, except that there are two separately heated sections, one above the center desorbate take-off, and one below. This provides a means of more aggressively preheating the adsorbent. This may become important if, for example, the process VOC's are higher in boiling point and therefore more difficult to desorb. In place of the single center electric element 4 in FIG. 1, two separate electrical elements 20 and 21 are used to bridge the center take-off pipe section. The result is the creation of upper and lower independently heated zones, with an equal electrical potential at the new elements 20 and 21. As in all other cases, the new elements 20 and 21 are different in proportion and size from that with which they are paired (electrodes, or electrical elements, 3 and 5).

Figure 5:
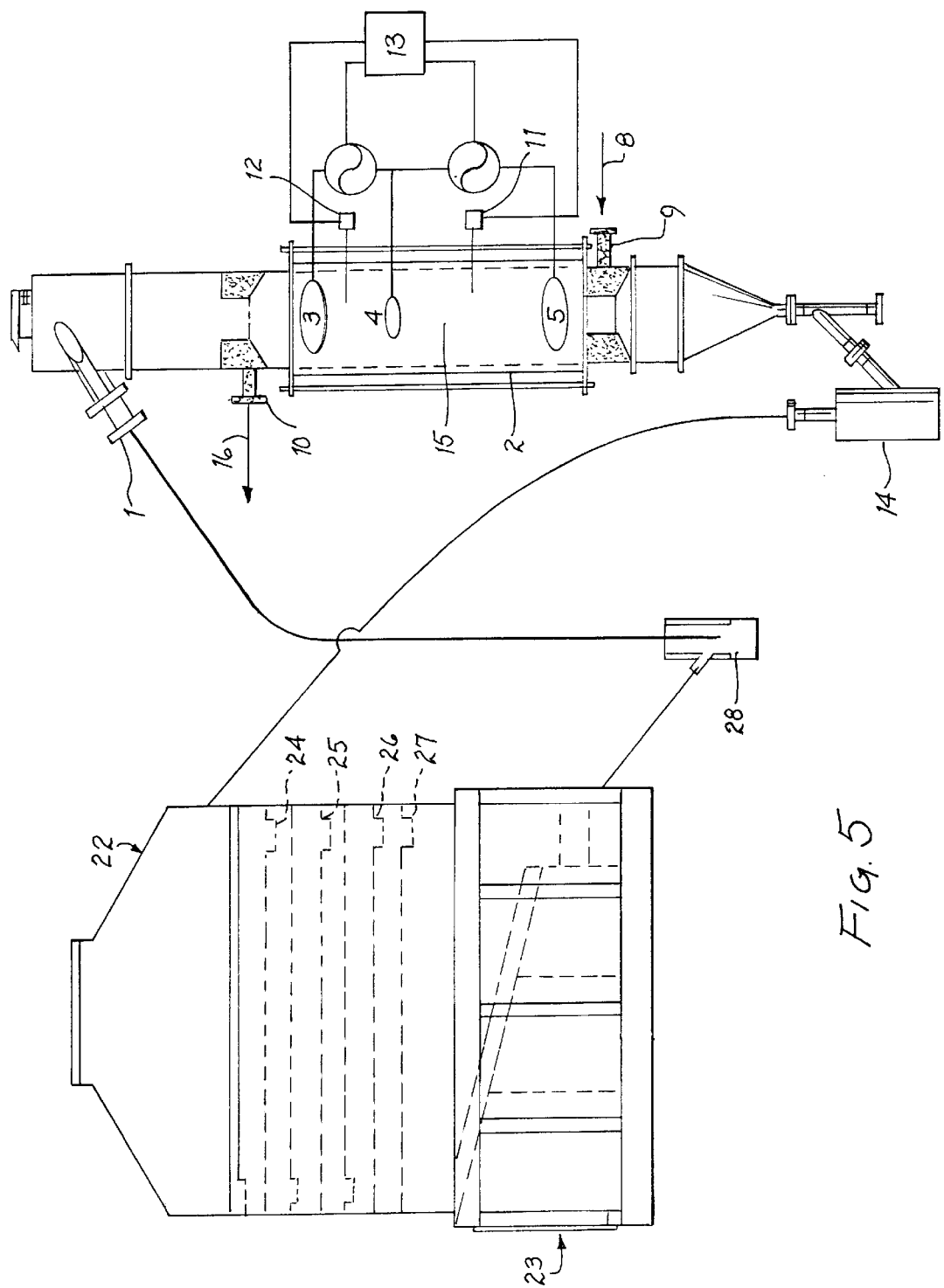
FIG. 5 is an illustration of the system of the present invention incorporated in a continuous adsorption/desorption process.

FIG. 5 is an illustration of the system of the present invention incorporated into a continuous adsorption/desorption process for the continuous cleansing of VOC laden process air combined with the continuous regenerating of adsorbent material. Process air containing vaporized VOC's, enters adsorber 22 at the bottom inlet 23. The VOC's are removed from the air stream as it passes up through sieve trays 24 through 27, on which the adsorbent material is distributed. The VOC laden adsorbent material exits the adsorber via take-off nozzle 28, and is transferred to the desorber top section. The adsorbent is then processed as described in any of the embodiments described above. It is returned to the top of the adsorber 22 via pneumatic take-off nozzle 14 located at the desorber bottom. This arrangement provides a continuous integrated means of collecting and treating VOC's from process air. The final treatment of the collected VOC's can be achieved through oxidation or recovery, for example, as described in U.S. Pat. No. 5,904,750.

Figure 6:
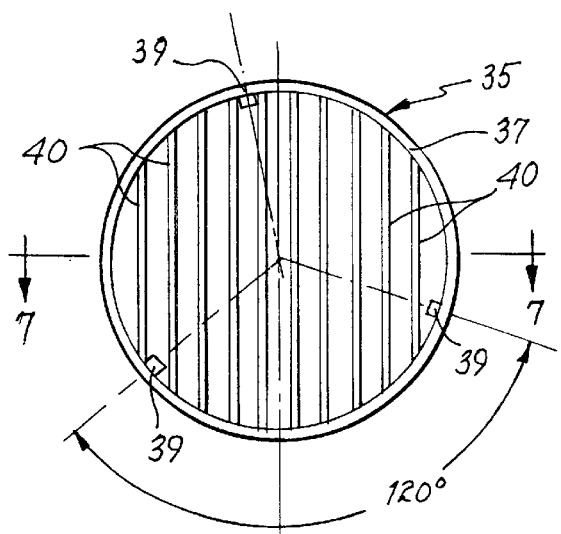
FIG. 6 is an illustration of a suitable electrical element or electrode for use in the apparatus of the present invention.
Figure 7:
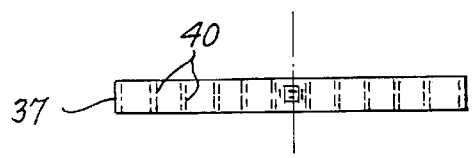
FIG. 7 is a cross-sectional view of FIG. 6 taken along line 7—7.

FIGS. 6 and 7 are an illustration of the top and cross-sectional view, respectively, of typical electrical element or electrode 35. The electrode is positioned within the system of the present invention in intimate contact with the adsorbent material as it passes over, around and through the electrode. The electrode may be formed of a circumferential metal ring 37 and attachment points 39 positioned at 120° intervals about the ring 37. The ring supports a plurality of parallel spacer bars 40 which are secured to the ring and are positioned to contact the adsorbent material as it passes past and through the ring. Electrical connection is made to the ring 37 which places all parts of the electrode at the same potential. The material with which the electrode is made may be selected from any conductive material and of a size suitable to insure that the maximum contact is made with the adsorbent material passing by and therethrough.

The specific shape of electrode is not critical; however, if the column of adsorbent material being utilized in the method and apparatus of the present invention is cylindrical, then it is most appropriate for the electrode to take the circular outside form as shown in FIGS. 6 and 7. It has been noted that the utilization of the parallel bars attached to and extending from the metal ring 37 may take other forms and may conveniently utilize concentric rings or similar structural shapes. It is to be noted that as described above in connection with the embodiment of FIGS. 1 through 4, the dimensions of the electrode 35 will depend on the diameter of the vessel supporting the column of adsorbent material and is usually slightly less than the diameter of the vessel. The second electrode (if two electrodes are used) is of significantly different dimension as described in connection with the above embodiments. The different dimension may be in the form of an electrode having a similar or identical shape to that shown in FIGS. 6 and 7 but with simply a smaller outside diameter (usually approximately 50% diameter). However, it has been found that the shape of the electrode may be varied considerably to accommodate the desired current density existing in the cross-section of the column of adsorbent material. That is, the size differential between two electrodes positioned within a column of adsorbent material may be constructed to encourage radial and well as axial current through the material to generate a more uniform heating pattern throughout the material column.

An example of the utilization of the method and apparatus of the present invention is illustrated by reference to the chart of FIG. 8 wherein the transverse temperature gradient in a column of adsorbent material was compared utilizing spaced electrodes, each of which were identical in configuration and dimension as opposed to a pair of electrodes, the second of which exhibited a cross-section area of appropriately 50% of the cross-sectional area of the first electrode.

Figure 8:
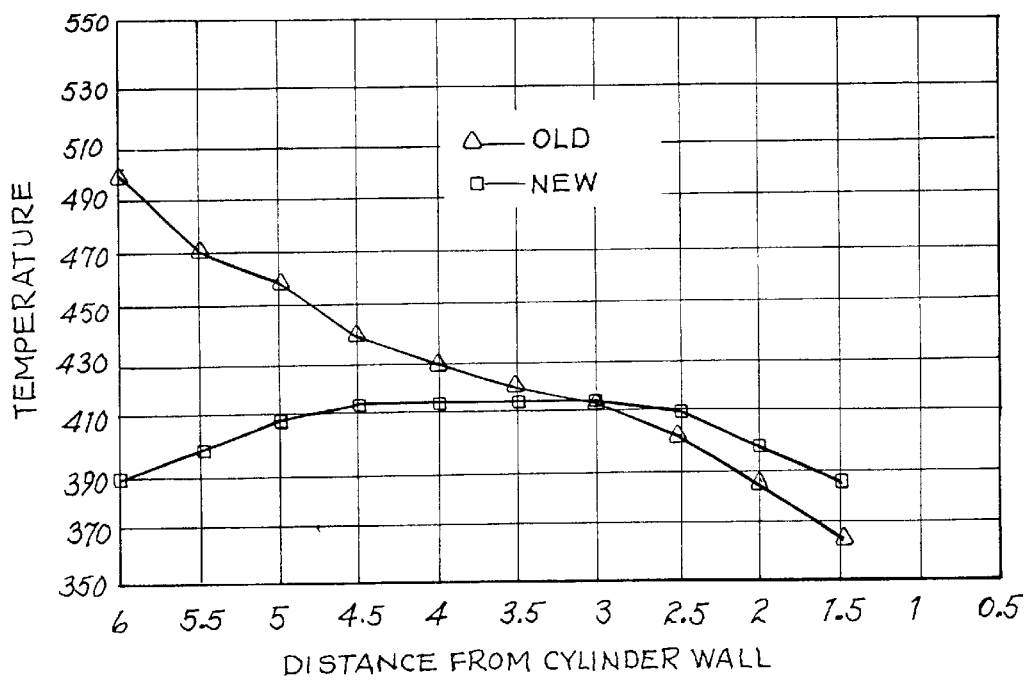
FIG. 8 is a graph of temperature gradients useful for describing the system of the present invention.

It may be seen by reference to FIG. 8 that the temperature gradient of the old arrangement of electrodes resulted in a radial differential in temperature across the cross-section of the adsorbent material column from a maximum of 500° F. at the center of the column to less than 370° F. at a position close to the cylinder wall of the vessel. In contrast, the utilization of the electrodes having the predetermined cross-sectional differences resulted in a considerably more uniform temperature variation that extended at the center of the column at 390° F. to essentially the same temperature at a position close to the cylinder wall. It may be noted that similar results were obtained using spaced electrodes of the same dimensions, but also including a passive conductive element positioned between the electrodes; that is, a conductive element, which may be shaped similarly to one of the electrodes but not connected to any electrical source, is positioned between the electrodes and provides a low resistance current path in a direction that is essentially transverse of the longitudinal axis of the column of adsorbent material. In this manner, the current flowing from one electrode to the other as a result of the voltage applied thereto not only travels longitudinally of the vessel but is also forced to incorporate a radial component to more evenly distribute the current density, and thus the heating of the adsorbent material, in the vessel.

Although the present invention has been shown and described with reference to particular preferred embodiments, various additions, deletions and modifications that are obvious to a person skilled in the art to which the invention pertains, even if not shown or specifically described herein, are deemed to lie within the scope of the invention as encompassed by the following claims.

What is claimed is:

1. A method for heating a mass of adsorbent material comprising the steps:

(a) providing a vessel having a first electrode of predetermined size therein;

(b) providing a second electrode having a size approximately 50% smaller than said predetermined size in said vessel spaced from said first electrode;

(c) directing a mass of adsorbent material into said vessel in contact with said first and second electrodes; and (d) applying a voltage between said electrodes to establish a current and heat said material.

2. A method for heating a mass of adsorbent material comprising the steps:

(a) providing a vessel having a first electrode of predetermined size therein;

(b) providing a second electrode having a size approximately 50% smaller than said predetermined size in said vessel spaced from said first electrode;

(c) directing a mass of adsorbent material into said vessel in contact with said first and second electrodes;

(d) connecting said electrodes to a controllable electrical power source; and (e) controlling the electrical power applied to said electrodes to establish a predetermined temperature in said material.

3. Method for heating a mass of adsorbent material comprising the steps:

(a) providing a vessel having a first and a second electrode spaced from each other;

(b) providing a passive conductive element positioned between said first and second electrodes;

(c) directing a mass of adsorbent material into said vessel in contact with said first and second electrodes and in contact with said passive conductive element; and (d) applying a voltage between said electrodes to establish a current in and heat said material.

4. Method for heating a mass of adsorbent comprising the steps:

(a) providing a vessel having a first and a second electrode therein spaced from each other;

(b) providing a passive conductive element positioned between said first and second electrodes;

(c) directing a mass of adsorbent material into said vessel in contact with said first and second electrodes and in contact with said passive conductive element;

(d) connecting said electrodes to a controllable electrical power source;

(e) controlling the electrical power applied to said electrodes to establish a predetermined temperature in said material; and (f) detecting the temperature of said material.

* * * * *